United States Patent [19]

Kimock et al.

[11] Patent Number: 4,855,594
[45] Date of Patent: Aug. 8, 1989

[54] APPARATUS AND PROCESS FOR IMPROVED DETECTION LIMITS IN MASS SPECTROMETRY

[75] Inventors: Fred M. Kimock, Macungie; John H. Phillips, Fogelsville, both of Pa.

[73] Assignee: Air Products and Chemicals, Inc., Allentown, Pa.

[21] Appl. No.: 163,507

[22] Filed: Mar. 2, 1988

[51] Int. Cl.⁴ .................................................. B01D 59/44
[52] U.S. Cl. ..................................... 250/282; 250/281; 250/288
[58] Field of Search .................. 250/282, 285, 288 R, 250/287, 423 R

[56] References Cited

U.S. PATENT DOCUMENTS

| | | |
|---|---|---|
| 3,920,986 | 11/1975 | Fies, Jr. ................................. 250/282 |
| 3,974,380 | 8/1976 | Rettinghaus et al. . |
| 4,018,241 | 4/1977 | Sodal et al. ........................... 250/282 |
| 4,039,828 | 8/1977 | Pokar et al. . |
| 4,258,257 | 3/1981 | Brackmann . |
| 4,263,507 | 4/1981 | Schmidt . |
| 4,365,157 | 12/1982 | Unsold et al. . |
| 4,730,111 | 3/1988 | Vestal et al. ........................... 250/282 |

OTHER PUBLICATIONS

Lyubimov et al.–JETP Letters–Soviet 1968, p. 49.
PCT Publication WO81/02366–Rosengren et al.-8/21/81

*Primary Examiner*—Janice A. Howell
*Assistant Examiner*—Michael Aronoff
*Attorney, Agent, or Firm*—Richard A. Dannells, Jr.; William F. Marsh; James C. Simmons

[57] ABSTRACT

A system and method for detecting trace levels of a sample gas in a mass spectrometer having a vacuum chamber with a vacuum pump, an ionizer, extracting and imaging lens and a detector. A high pressure sample gas pulse is introduced into the vacuum chamber through a small orifice to produce a high density of sample gas in a region near the orifice. The density of the sample gas pulse is sufficient to substantially sweep residual background gas from the path of the pulse. A portion of the sample gas pulse is ionized and ions are extracted and imaged.

37 Claims, 8 Drawing Sheets

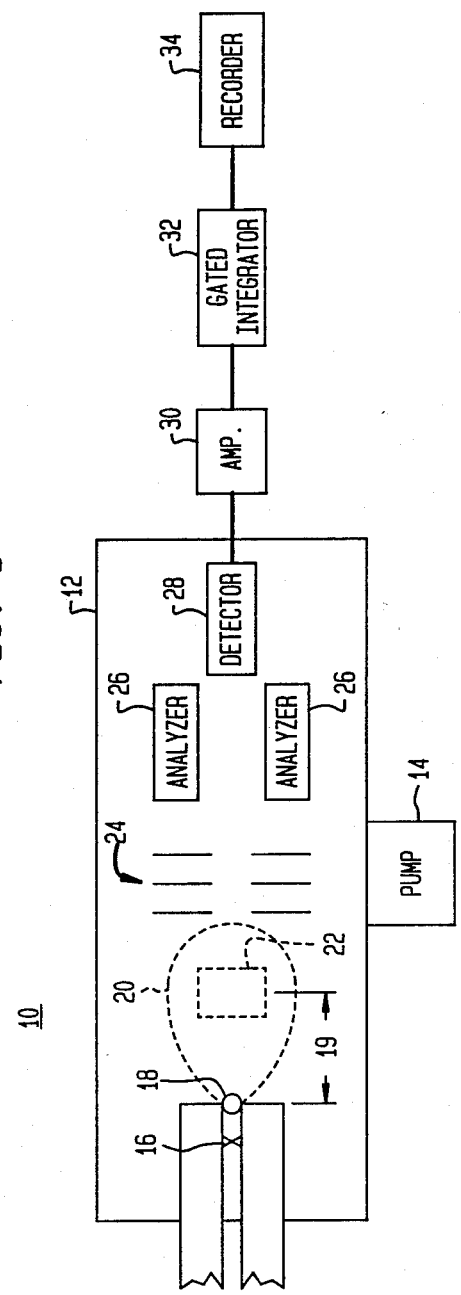

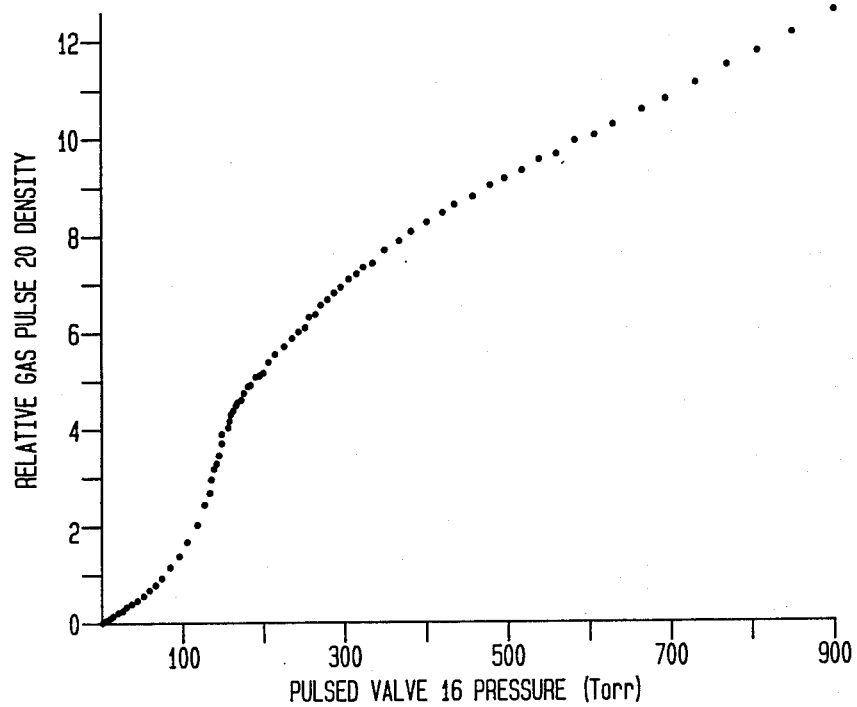

APPARATUS AND PROCESS FOR IMPROVED DETECTION LIMITS IN MASS SPECTROMETRY

BACKGROUND OF THE INVENTION

A. Field of the Invention

This invention relates to mass spectrometry and in particular to improving signal-to-background ratio.

B. Background Art

The mass spectrometer is an extremely sensitive gas analyzer. A major problem in detecting extremely small concentrations of a sample substance is interference with the measurement due to small amounts of background substance remaining in the spectrometer from previous measurements. These background substances objectionably decrease the signal-to-background ratio of the detection signals.

It is well known in the art to use a vacuum pump to purge these background gases. However, the entire measurement apparatus of a mass spectrometer is in a vacuum chamber making a completely effective vacuum purge difficult. Additionally, some of the interfering substances have physically attached or chemically reacted with the walls of the vacuum chamber or elements within the vacuum chamber. During a subsequent analysis the substances desorbed from the walls and caused interfering background signals. The background signals interfered with detection and measurement of very small trace levels of components. This was a particular problem when the residual gas was the same substance as a substance being quantified in a subsequent measurement.

Another particularly difficult problem arose when analysis was performed to study trace nitrogen, trace water, or trace carbon dioxide because these substances were present at all times in the vacuum chamber. It was very difficult to completely remove these substances from the vacuum chamber and the substances thus tended to reside within the chamber.

One method of dealing with the problems of measuring trace levels of a substance in a mass spectrometer is taught in U.S. Pat. No. 3,974,380 issued to Rettinghaus. The system of Rettinghaus collimated the molecules of a sample gas into a beam rather than permitting the sample gas to fill up the vacuum chamber. The collimated beam of sample gas molecules was then ionized and analyzed. This collimated molecular beam approach decreased residual gas within the vacuum chamber by decreasing the amount of gas injected into the vacuum chamber and limited the surfaces which came in contact with the sample gas. The sample gas was formed into a collimated molecular beam using a nozzle as a gas inlet to form a jet of sample gas.

Condensing such a collimated molecular beam onto a cryogenic beam stop to minimize background contamination is shown in U.S. Pat. No. 4,039,828 issued to Pokar. The cryogenic beam stop caused the molecules of the beam to collect on the beam stop rather than on the walls of the vacuum chamber.

Pokar also taught eliminating a filament which was used to ionize gas molecules. This filament was a wire which was struck by the sample gas beam causing molecules of the sample gas to collect on the filament. The wire thereby provided a "memory" since collected sample gas molecules would remain on the filament until the next measurement. In Pokar this filament ionizer was replaced with a laser beam ionizer which ionized the sample molecules while providing no physical obstruction upon which the molecules could condense.

It is also known to pulse a fluid stream of sample into the vacuum chamber while using photoionization, such as a laser, in a region which is free of surfaces. The pulsed fluid stream system helped minimize the memory effect. This system is taught in U.S. Pat. No. 4,365,157 issued to Unsold.

It is also known that the signal-to-background ratio can be enhanced by increasing the amount of sample gas introduced into the mass spectrometer. For example, a closed ion source may be used to allow the ionizer to operate at a pressure of $10^{-3}$ Torr, nearly one hundred times greater than with a standard ion source. An orifice in the closed ion source allowed for a pressure differential of about $10^3$ Torr between the ion source and the mass filter of the spectrometer. However, in these methods residual gases remained within the mass spectrometer ion source itself and contributed interfering background signals during later analyses.

It is known that the signals resulting from the background gas molecules within a mass spectrometer can be distinguished from the signals of a sample gas in a molecular beam based upon their differential velocity distributions. See for example, Lyubimov et al, JETP Letters - SOV., 1968, page 49. It is further known that the useful sample gas signals and the interfering background signals can be separated electronically by means of a modulated molecular beam and phase sensitive detection.

The phase sensitive detectors thus may distinguish between these two types of signals and thereby distinguish between sample molecules and molecules of background substances. The use of phase sensitive detection to increase signal-to-background ratio is disclosed in U.S. Pat. Nos. 4,258,257 and 4,263,507 and Patent Cooperation Treaty Application No. PCT/SE81/00040 filed on Feb. 12, 1981 by Rosengren.

SUMMARY OF THE INVENTION

A system and method for detecting trace levels of a sample gas in a mass spectrometer having a vacuum chamber with a vacuum pump, an ionizer, extracting and imaging lens and a detector. A high pressure sample gas pulse is introduced into the vacuum chamber through a small orifice to produce a high density of sample gas in a region near the orifice. The density of the sample gas pulse is sufficient to substantially sweep residual background gas from the path of the pulse. A portion of the sample gas pulse is ionized and ions are extracted and imaged.

BRIEF DESCRIPTION OF THE DRAWINGS

FIG. 1 is a block diagram of the system of the present invention;

FIG. 1A shows the relationship of the density of a gas pulse of the present invention to valve pressure;

DETAILED DESCRIPTION OF THE INVENTION

Figure 2A:
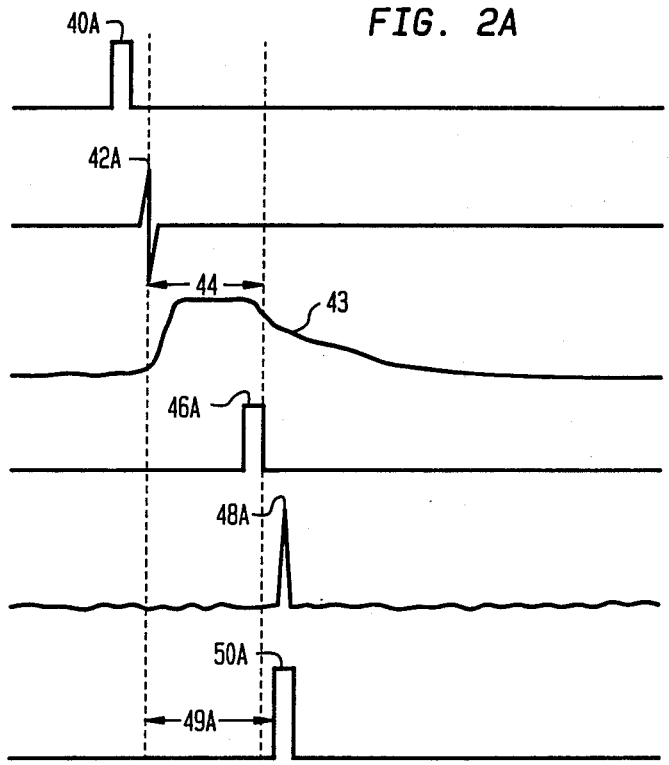
FIGS. 2A–B show synchronization signals for the system of the present invention.

Referring now to FIG. 1, there is shown a mass spectrometer system 10 of the present invention. Mass spectrometer system 10 includes a high vacuum chamber 12 which is evacuated by a high vacuum pump 14. Within high vacuum chamber 12 a sample gas pulse 20 is provided by way of a pulsed nozzle 16 which introduces a sample gas pulse 20 into a high vacuum chamber 12.

Molecules of sample gas pulse 20 are ionized by a conventional hot filament ionizer (not shown). The ionized molecules of sample gas pulse 20 are extracted and imaged by a conventional imaging lens 24 and analyzed in accordance with their mass and charge by a conventional mass analyzer 26. Ions from mass analyzer 26 strike and are detected by ion detector 28. The output signal of ion detector 28 is representative of the number of ions which strike it. This output signal of ion detector 28 is amplified by amplifier 30 and applied to a computer or recorder 34 by way of a gated integrator 32 for providing a tracing which indicates the number of ions striking ion detector 28 as a function of mass.

A sample to be analyzed is introduced into vacuum chamber 12 in the form of a short time duration very high density sample gas pulse 20 by pulsed nozzle 16 through nozzle orifice 18. Pulsed nozzle 16 may provide a sample gas pulse 20 with a time duration on the order of one hundred microseconds and it is believed that the local pressure in the region in the vicinity of orifice 18 is on the order of one thousandth Torr or greater. The pressure of the sample gas behind nozzle 16, and the diameter of nozzle orifice 18 are selected such that the local pressure of sample gas pulse 20 in ionizing region 22 is in the range of one one-thousandth to one one-hundredth Torr.

The high pressure behind nozzle 16 and the diameter of orifice 18 cause sample gas pulse 20 to have extremely high density. Because sample gas pulse 20 has such extremely high density, very little of the interfering residual background gas which may be contained within high vacuum chamber 12 is present within the volume of sample gas pulse 20. It is believed that as the leading edge or boundary of high density sample gas pulse 20 travels through vacuum chamber 12, the leading boundary effectively pushes residual background molecules out of the way of sample gas pulse 20. When sample gas pulse 20 travels from nozzle orifice 18 to ionizing region 22, an ionizer (not shown), for example a laser or electron beam, ionizes sample gas molecules within the extremely high density region of sample gas pulse 20 immediately behind the leading boundary of sample pulse 20.

Thus, compared with prior art systems the molecules which are ionized in ionizing region 22 are more preferentially molecules of sample gas rather than interfering residual background gas Because the local density of sample gas molecules in the region of the ionizer is higher than that of prior art mass spectrometers, the useful sample signals are increased, and thus the signal-to-background ratio of system 10 is greatly increased compared with prior art mass spectrometers.

Thus signal-to-background ratio is increased because the useful sample signal relating to sample gas pulse 20 is greatly increased. This useful sample signal is greatly increased because the ions produced in ionizing region 22 and detected by ion detector 28 originate in the very high density region in the vicinity of orifice 18. The increased signal-to-background ratio of system 10 permits system 10 to detect trace levels of components in sample gas pulse 20 with increased sensitivity.

In order to provide the extremely high density region within the volume of sample gas pulse 20 in the vicinity of orifice 18, the pressure at which sample gas 20 is introduced and the diameter of orifice 18 must be carefully selected. For example, if the pressure within vacuum chamber 12 is within the conventional range of approximately $10^{-8}$ Torr and $10^{-5}$ Torr, the pressure within pulse nozzle 16 may be within the range of approximately ten to one thousand Torr and the diameter of orifice 14 may be in the range of one-quarter to two millimeters. These values of pressure within pulsed nozzle 16 and diameter of orifice 18 are believed to provide the pressure of approximately one one-thousandth Torr or greater within the volume of sample gas pulse 20 in the vicinity of orifice 18 as previously described.

Additionally, distance 19 between orifice 18 and ionizing region 22 is selected to be within the range of zero to ten inches. The most preferred value of distance 19 is approximately two inches. If a distance 19 which is too large is selected, ionization occurs in a region which does not have an extremely high density of sample gas 20 and the improved signal-to-background ratio is not observed because the pressure of sample gas pulse 20 drops off rapidly as a function of the distance from orifice 18.

The extremely high density of sample gas pulse 20 increases the signal-to-background ratio by increasing the useful sample signal as previously described.

Additionally, the extremely high pressure of sample gas pulse 20 increases the signal-to-background ratio of system 10 by decreasing the background signal. This decrease in the background signal is provided by causing a quasi-continuous substantially smooth flow of sample gas 20 from nozzle 16 to ionizing region 22 in order to sweep sample gas 20 out of ionizing region 22.

It has been observed that the signal-to-background ratio of mass spectrometry system 12 increases uniformly with an increase in the pressure of sample gas pulse 20. This effect is believed to be due to the sweeping of interfering residual background molecules from the path of sample pulse 20 as previously described. However, it was also observed that when the pressure of sample gas pulse 20 reached a threshold level the quasi-continuous smooth flow of sample gas 20 from nozzle 16 to ionizing region 22 occurred and a further abrupt improvement in signal-to-background ratio resulted. Experimental observation of the onset of quasi-continuous gas flow is presented graphically, in FIG. 1A. For the measurement, a conventional Fast Ionization Gauge pressure detector (R. M. Jordan Co.) was oriented in place of the ionizer (not shown) at a distance 19 of approximately one-half inch downstream of nozzle orifice 18. A study of the density of sample gas pulse 20 as a function of pressure in pulsed valve 16 illustrates an abrupt increase in the density of pulse 20 sample gas at a pressure of about seventy Torr. For this specific orifice-to-ionizing region distance 19, pulsed valve pressures greater than seventy Torr cause background gases to be swept out of the ionizer region 22.

At this threshold pressure of sample gas pulse 20 at which quasi-continuous flow of sample gas begins, there was a sharp increase in signal-to-background ratio. This increase of signal-to-background ratio is in addition to the increase in signal-to-background ratio which is due to increased useful sample signal as previously described. This additional sharp increase in signal-to-background ratio is believed to be due to a decrease in interfering residual background gas caused by the sweeping of gas molecules out of the region of ionizing region 22.

The pulsing frequency of pulsed nozzle 16 must be maintained below a predetermined level in order to obtain the observed improvement in signal-to-background ratio. If the pulsing frequency of pulse nozzle 16 is too high, vacuum pump 14 cannot remove sample gas 20 from vacuum chamber 12 as quickly as sample gas 20 is introduced into vacuum chamber 12. Thus, a pulsing frequency which is too high may introduce sample at a rate which causes the pressure of vacuum chamber 12 to rise above the pressure required for mass analyzer 20 to operate. It has been observed that when a one thousand liter per second high vacuum pump is used, a pulsing frequency in excess of approximately fifty Hertz causes the pressure of vacuum chamber 12 to rise above an acceptable level.

The pulsing frequency of pulse nozzle 16 is determined by a conventional master frequency generator (not shown) which triggers pulse nozzle 16 at a selected frequency. When the triggering frequency is maintained below approximately fifty Hertz, vacuum chamber 12 is evacuated at substantially the rate that sample substance is introduced into vacuum chamber 12 by way of orifice 18. This substantially prevents the pressure within vacuum chamber 12 from rising above the level required by conventional mass analyzer 26 for proper operation.

Thus in system 10, the signal-to-background ratio is believed to be improved both by (1) increasing the useful sample signal and (2) by decreasing the interfering residual background signal.

In contrast to the prior art, both effects are achieved by adjustment of the pressure and flow dynamics of the injected sample gas. Compared to prior art mass spectrometers, independent measurements of useful sample signals and interfering residual background signals, and/or separation of signal and background by electronic means are not required.

When sample gas pulse 20 is introduced into vacuum chamber 12 by pulse nozzle 16 and the molecules of sample gas pulse 20 are ionized as previously described, the ions which are focused by lens 24 and distributed in accordance with their mass by mass analyzer 26 eventually strike ion detector 28. The output signal of ion detector 28 is amplified by amplifier 30 and gated to recorder 34 by gated integrator 32. Thus gated integrator 32 must gate the output signal of amplifier 30 synchronously with the pulses of pulse nozzle 16 and in accordance with the travel time of ions from ionizing region 22 to detector 28 in order to gate the correct signals through to recorder 34.

Thus after a pulse of sample gas 20 is introduced by pulsed nozzle 16, there must be a predetermined time delay before the firing of gated integrator 32. This time delay is equal to the sum of the following times: (1) the time required for molecules of sample gas pulse 20 to travel distance 19 from orifice 18 to ionizing region 22, (2) the time for the ionized molecules to be processed by lens 24 and mass analyzer 26, and (3) the time for the molecules to be detected by detector 28.

After a pulse of pulsed nozzle 16, gated integrator 32 must be delayed this total period of time and synchronized with the pulses of pulsed nozzle 12 before applying a signal from detector 28 to computer or recorder 34 so that the detection signal applied to computer or recorder 34 is produced only by ionized molecules of the high density region of sample gas pulse 20. If gated integrator 32 is not synchronous with pulses of nozzle 16 and delayed the correct amount of time, the signals supplied to recorder 34 are not associated with ionization of the high density region of sample gas pulse 20.

Figure 2B:
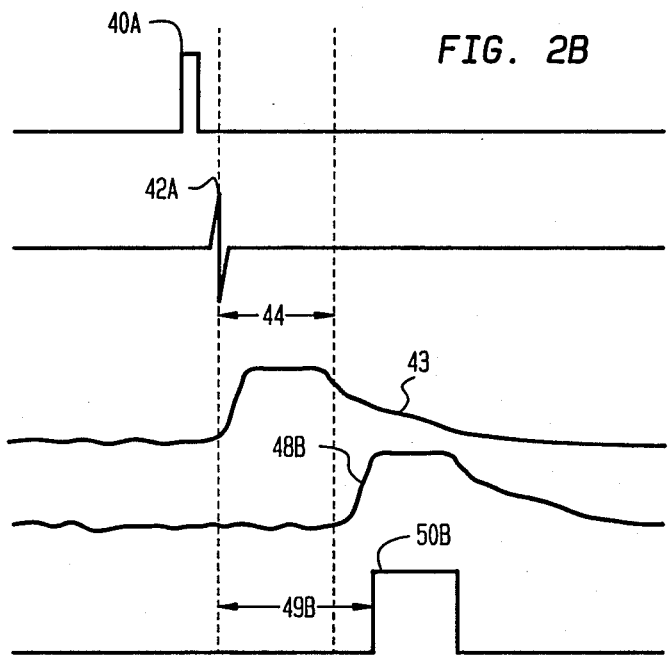
Figure 2C:
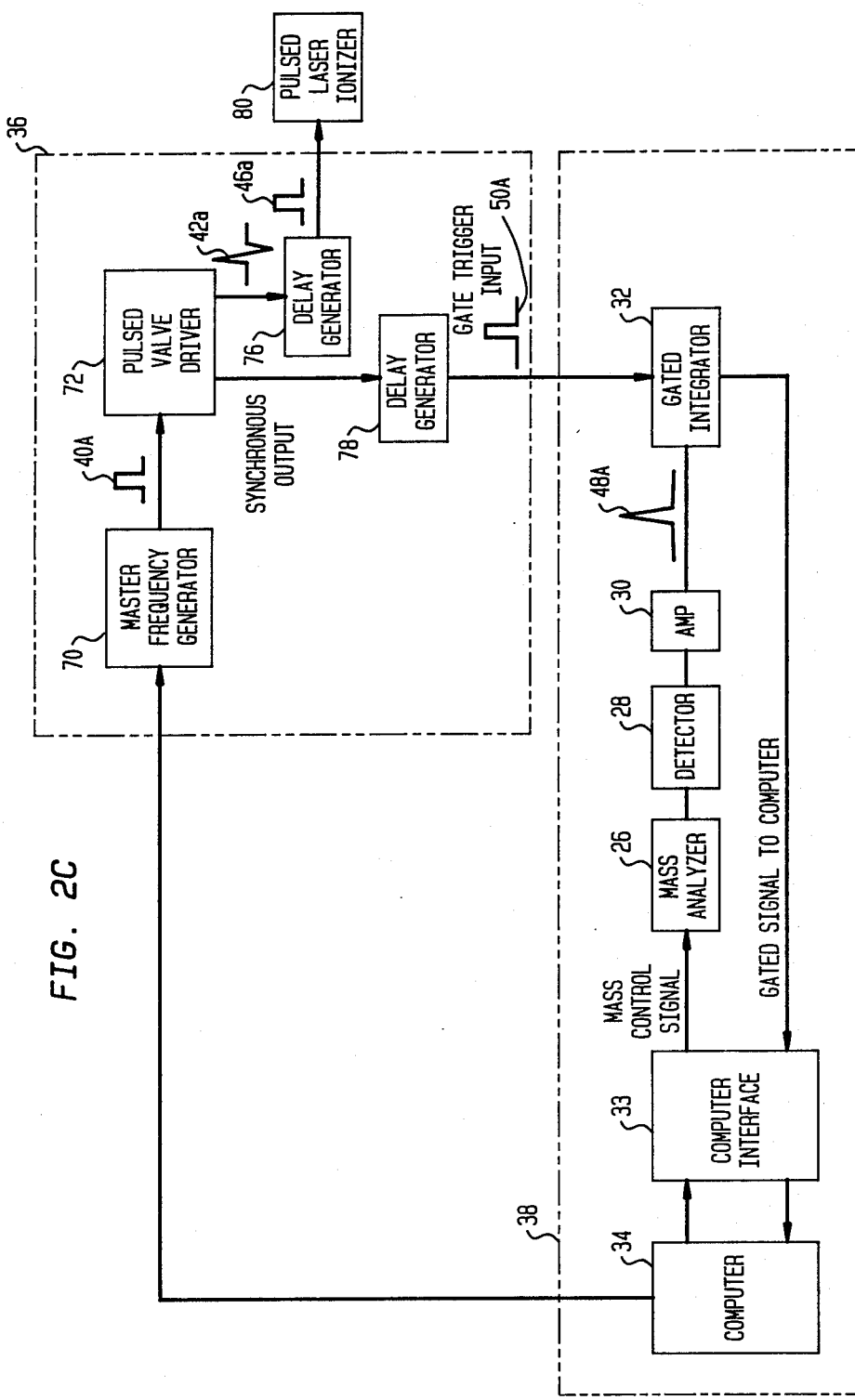
FIGS. 2C–D show a system for providing the pulses of FIGS. 2A–B.
Figure 2D:
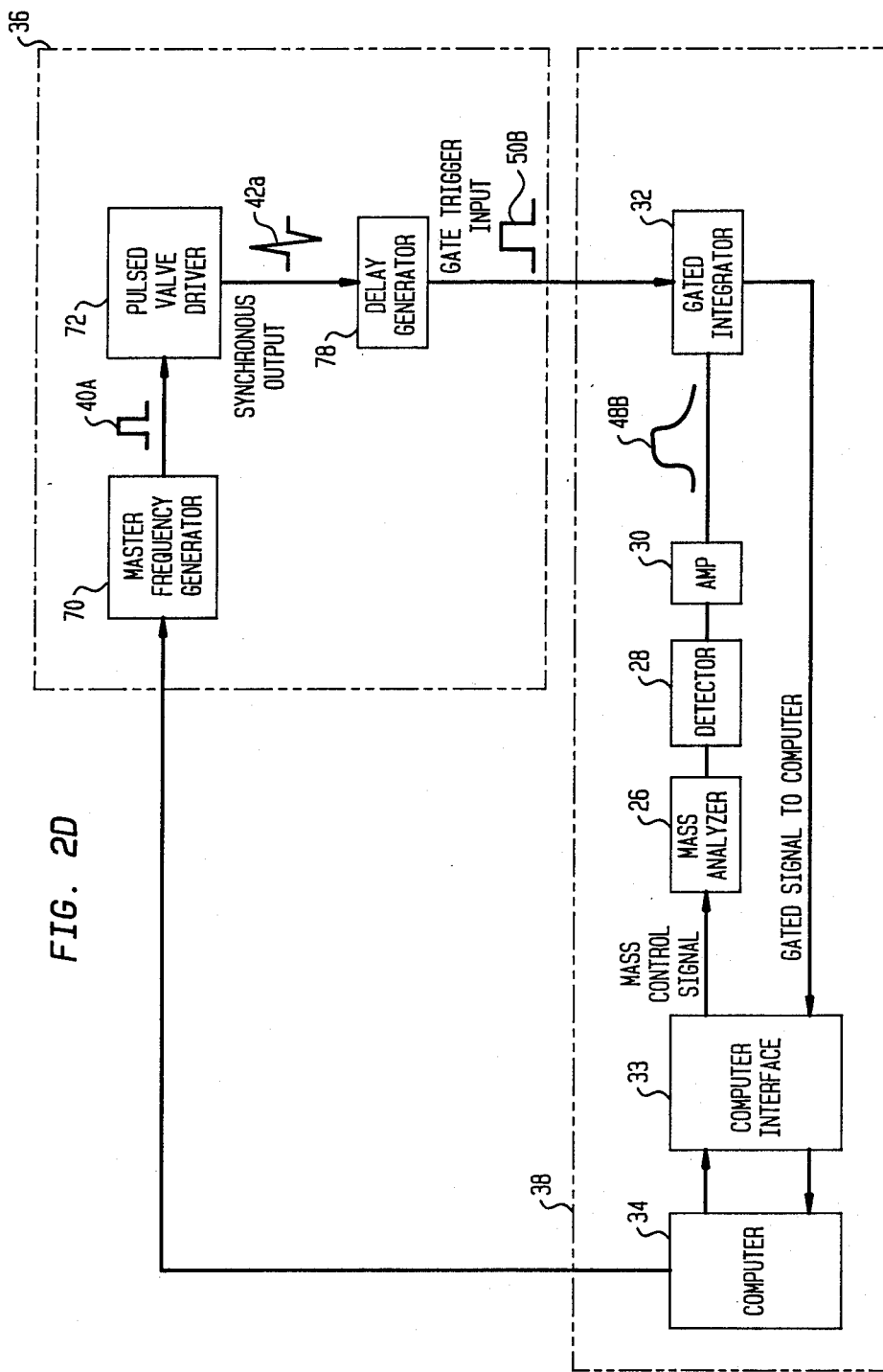

Referring now to FIGS. 2A, 2B, 2C, 2D there are shown pulse synchronization signals and block diagrams for mass spectrometer system 10. FIG. 2A shows a representation of synchronization signals for mass spectrometer system 10 using a laser ionizer (not shown). FIG. 2B shows a representation of synchronization signals for mass spectrometer system 10 using a hot filament and plate ionizer. FIGS. 2C and 2D show block diagrams of systems for producing time delays and pulse synchronization signals as shown in FIGS. 2A and 2B.

Master trigger signal pulse 40A is generated either by a computerized system clock or by conventional pulse generator 70. Master pulse generator 70 may be a system such as Global Specialities Model 4001. Pulse 40A is applied to the trigger input of pulsed valve driver 72 to cause pulsed valve 16 to open. Pulsed valve driver 72, for example, may be Model Iota One, provided by General Valve Company, or Model PSV Power Supply, provided by R.M. Jordan Company.

Application of pulse 40A from master pulse generator 70 to pulsed valve driver 72 causes pulsed valve 16 to introduce sample gas pulse 20 through nozzle orifice 18 into high vacuum chamber 12. Pulse 42A thus indicates the time at which pulsed valve 16 is actuated. Sample gas pulse 20 then expands into high vacuum chamber 12. The intensity profile of sample gas pulse 20 versus time is shown as waveform 43. Following expansion from orifice 18, molecules of sample gas pulse 20 enter ionizing region 22 after transit time 44. Transit time 44 is determined by the molecular velocities and distance 19. For distance 19 equal to two inches, the molecular transit time 44 from orifice 18 to ionizing region 22 is about one hundred microseconds.

For laser ionization, it is necessary to fire the pulsed laser beam at a time corresponding to transit time 44. In FIG. 2A, the laser pulse is fired by pulse 46A. The delay time between triggering of pulse 46A and pulse 42A, which corresponds to transit time 44, is provided either by a computer clock or a suitable delay generator 76. Delayed generator 76 may be a Berkley Nucleonics Corporation Model 7010 digital delay generator. Upon interaction of the pulsed laser beam from pulsed laser ionizer 80 with gas pulse 20, a burst of ions is generated.

The ions are extracted by lenses 24, mass analyzed by analyzer 26, and detected by detector 28. Analyzer 26 may be of the quadrople, magnetic sector a time-of-flight type. Detector 28 is typically either a faraday cup or electron multiplier. Ions striking detector 28 produce a signal pulse 48A which is proportional to the ion intensity. The detector signal, following amplification is integrated by gated integrator 32. The gate of gated integrator 32 may be triggered from a second delay generator 78 at a time 49A after pulse 42A where time 49A is greater than time 44. The time difference between time 49A and time 44 corresponds to the flight time of ions through ion lens 24 and mass analyzer 26 to detector 28.

For electron impact ionization, as illustrated in FIG. 2B, the ionizer is operated continuously. Thus a broad pulse of ions is formed and the time profile corresponds closely to the time profile of gas pulse 20 shown as waveform 43. Sample ions are extracted by lens 24, mass analyzed by mass analyzer 26, and detected by detector 28. Lenses 24, mass analyzer 26, and detector 28 may be the same as those described for laser ionization. Mass analyzed ions striking detector 28 produce signal pulse 48B, which is proportional to the ion intensity. Following amplification, the detector signal is integrated by gated integrator 32. The gate of gated integrator 32 may be triggered by delay generator 78 at time 49B after pulse 42A. The time difference between time 49B and time 44 corresponds to the flight time of ions through ion lenses 24 and mass analyzer 26 to detector 28.

For either laser 80 or electron impact ionization schemes, a mass spectrum may be recorded as shown in FIGS. 2C,2D. FIG. 2C describes a system for data collection for laser ionization and provides the waveforms of FIG. 2A. FIG. 2D describes a system for data collection for electron impact ionization and it provides the waveforms of FIG. 2B. Each data acquisition system includes two major components, coupled to each other through gated integrator 32: (1) a frequency generating and timing component defined generally by dotted line 36, and (2) a mass-scanning and data collection component defined generally by dotted line 38. It will be understood by those skilled in the art that computer 34 may control either or both of these components.

The frequency generating and timing component of dotted line 36 is required to initiate gas pulse 20 and insure synchronous ionization and signal integration in gated integrator 32. Computer 34 thus serves two functions. First, by way of a signal to mass analyzer 26, computer 34 determines the mass of ions to be analyzed and detected by detector 28. Second, computer 34 synchronously receives data from gated integrator 32. Thus, by scanning the voltage applied to mass analyzer 26 and synchronously receiving signals from gated integrator 32, computer 34 may record a plot of ion signal versus mass position. Communication between computer 34 and gated integrator 32 occurs through computer interface 33, where computer interface 33 may be a Stanford Research Systems SR 245. Computer interface 33 is controlled by software such as a modified version of Stanford Research Systems SR 265.

In the first few microseconds after pulsed valve 16 opens, introduced sample gas pulse 20 is not very directional and small portions of sample gas pulse 20 may even travel vertically above and below nozzle orifice 18. However, if the conditions of pressure in orifice diameter previously described are met, sample gas pulse 20 assumes the shape as shown in FIG. 1 in about 10 microseconds. At this time sample gas pulse 20 exists as a quasi-continuous gas flow from nozzle 16 toward ionizing region 22 in order to substantially sweep interfering residual background gas from its path.

Sample gas pulse 20 then expands into high vacuum chamber 12. Sample gas pulse 20 is introduced into high vacuum chamber 12 at extremely high, even supersonic speed by nozzle orifice 18. It is believed that under sonic or supersonic gas flow conditions, the leading portion of sample gas pulse 20 is bounded by a shock wave structure called a Mach disk (not shown). The Mach disk is thought to be impermeable to residual background gas. Residual background gas is therefore greatly reduced within the volume of sample gas pulse 20 by being swept aside by Mach disk. This greatly increases the signal-to-background ratio of mass spectrometer system 10 a previously discussed.

It may be possible that a shock wave does not exist at the leading boundary of sample gas pulse 20, but that the density of sample gas pulse 20 is high enough to result in a sample gas flow which is not molecular, but rather is viscous or near viscous. Viscous flow of gas pulse 20 may likewise sweep residual background gases from area of gas pulse 20, resulting in greatly increased signal-to-background ratio of mass spectrometer system 10.

Thus, compared with prior art systems, the molecules which are ionized in ionizing region 22 are more preferentially molecules of sample gas rather than interfering residual background gas. Because molecules of sample gas rather than molecules of residual gas are more preferentially ionized, the signal-to-background ratio of mass spectrometer system 10 is greatly increased.

In order to provide the enhanced signal-to-background described above, the following conditions must be met. The pressure of the extremely high density region within the volume of sample gas pulse 20 in the vicinity of nozzle orifice 18, the pressure of sample gas 20 within pulsed valve 16, and the diameter of nozzle orifice 18 must be carefully selected.

High pressure gas pulse 20 is injected by pulsed valve 16 through nozzle orifice 18 having a diameter within an overall range of approximately one-quarter of a millimeter to two millimeters. The preferred range for nozzle orifice 18 is approximately one-quarter of a millimeter to one millimeter. The most preferred diameter of nozzle orifice 18 is approximately one-half millimeter as previously described. Gas pulse 20 is composed of molecules to be analyzed by mass spectrometer system 10. Pulsed valve 16 may deliver sample gas pulse 20 in the order of approximately one hundred microseconds in duration.

As previously described, sample gas pulse 20 is introduced into vacuum chamber 12 at a pressure within the range of approximately from one ten-thousandth to one one-hundreth Torr. The preferred range for sample gas pulse 20 pressure is from approximately one one-thousandth to five one-thousandths Torr. The most preferred pressure for sample gas pulse 20 is approximately three one-thousandths Torr. If pressure of sample gas pulse 20 is allowed to become greater than approximately one one-hundreth Torr, sample gas pulse 20 begins to act too much like a liquid rather than a gas, and conventional mass analyzer 26 does not function as is well known to those skilled in the art. If the pressure of sample gas pulse 20 is allowed to become less than approximately one ten-thousandth Torr, the improved signal-to-background effect noted above ceases to occur.

As also previously described, to achieve the correct pressures for sample gas pulse 20, the pressure within pulsed valve 16 must be within a range of from approximately ten Torr to one thousand Torr. The preferred range for pressure within pulsed valve 16 is approximately from two hundred Torr to one thousand Torr. The most preferred pressure within pulsed valve 16 is approximately seven hundred sixty Torr. The choice of pressure within pulsed valve 16 depends only on what sample valve 16 pressure is required to provide the required pressure of sample gas pulse 20 within the known pressure of chamber 12 given a selected diameter of nozzle orifice 18.

The frequency with which pulse 40a occurs, causing sample gas pulse 20 to be introduced into vacuum chamber 12 is limited by the capacity of vacuum pump 14 to maintain the vacuum in vacuum chamber 12. The action of pulsed valve 16 must not cause the average pressure of vacuum chamber 12 to exceed approximately $5 \times 10^{-5}$ Torr. The preferred range of nozzle pulsing frequency to maintain this required pressure in vacuum chamber 12 is from approximately ten to fifty Hertz for typical mass spectrometer high vacuum pumps with pumping speeds up to about one-thousand liters per second. The lower limit of frequency of pulsing of pulsed nozzle 16 is substantially close to zero Hertz.

The distance 19 between nozzle orifice 18 and ionizing region 22 should be selected to be within the range of zero to ten inches. Preferably, the value of distance 19 is approximately two inches rather than conventional distances of usually several feet but at least one foot. These larger values of distance 19 were selected in known systems to avoid the high density of sample gas pulse 20 in order to avoid undesired molecular energy levels caused by colliding molecules. Mass spectrometry system 10 on the other hand relies upon molecular collisions to sweep away residual background gas molecules within vacuum chamber 12. System 10 thus relies upon a phenomenon, molecular collisions, which was avoided in the prior art.

Thus if a distance 19 which is too large is selected for mass spectrometer system 10, ionization occurs in a region which does not have an extremely high density of sample gas pulse 20 because the density of sample gas pulse 20 decreases sharply as a function of distance from nozzle orifice 18 and the improved signal-to-background ratio is not observed During transit time 44, sample gas pulse 20 travels distance 19 from nozzle orifice 18 to ionizing region 22.

Transit time 44 is the amount of time required for sample gas pulse 20 to travel from nozzle orifice 18 to ionizer region 22 and is thus determined in accordance with the velocity of sample gas 20 and with distance 19. Transit time 44 is preferably selected such that laser ionization controlled by pulse 46a occurs substantially behind the leading front boundary of sample gas pulse 20 in the region in which residual gas in vacuum chamber 12 has been swept away and sample gas pulse 20 has substantially high density.

When sample gas pulse 20 then enters ionizing region 22, an ionizer (not shown) ionizes sample gas molecules within the extremely high density region of sample gas pulse 20. The ionizer may comprise a laser device directing a beam of coherent light into ionizing region 22. The ionizer may also comprise a conventional electronic hot filament and plate. A laser ionizer is preferable because it presents no surfaces such as a filament and plate which may absorb molecules from sample gas pulse 20 causing permitting later desorption and possible contamination of a subsequent sample.

For mass spectrometer system 10 using a laser ionizer, laser firing signal 46a causes the laser ionizer to fire, thus ionizing molecules of sample gas pulse 20 within ionizing region 22. For mass spectrometer system 10 employing a conventional electronic hot filament and plate ionizer no timing pulse such as signal 46A is required to cause ionization, because a constant voltage may be applied to the electronic hot filament and plate.

Ionized molecules from sample gas pulse 20 enter lens 24, which comprises conventional electronic elements used to focus the ionized molecules of sample gas pulse 20. Focused ions from sample gas pulse 20 then pass through mass analyzer 26 and strike detector 28 at a time indicated by signal pulse 48a. For mass spectrometer system 10 using a laser ionizer, signal pulse 48a is of relatively short duration, on the order of several microseconds. This time duration corresponds to a convolution of the duration of the laser pulse initiated by pulse 46a, and energy spreading of the ionized molecules caused by the spatial profile of the laser beam within the ion extraction field.

For mass spectrometer system 10 employing a conventional electronic hot filament and plate ionizer, the duration of pulse 48B is extended for a period on the order of one hundred microseconds because ionization of sample gas pulse 20 continues the entire time period that sample gas pulse 20 is passing between the hot filament and the plate. Signals from detector 28 are amplified by amplifier 30 in a conventional manner.

Because an improved signal-to-background ratio is only observed for high density sample material within sample gas pulse 20, signals from detector 28 must be synchronously gated to screen out signals from before and after the signals corresponding to sample gas pulse 20. This assures that only signals corresponding to ionized molecules from sample gas pulse 20 are applied to recorder 34. Gated integrator 32 is used to gate signals from detector 28 to eliminate unwanted signals. Recorder 34 records gated signals from gated integrator 32. These gated detection signals may be reproduced on a chart displaying the mass spectrum of the molecules in gas pulse 20, displaying an enhanced useful sample signal and an attenuated background noise signal.

Depending on the distance between ionizing region 22 and detector 28, the period of time between pulse 46a (firing of the laser ionizer) and pulse 48a (arrival of ions from sample gas pulse 20) may be approximately ten microseconds or less. Pulse 50a represents the time that the gate of gated integrator 32 is active for measurement by recorder 34. Pulse 50a is timed to exclude unwanted signals while permitting recording of ionized molecules from sample gas pulse 20 as previously described.

Figure 3:
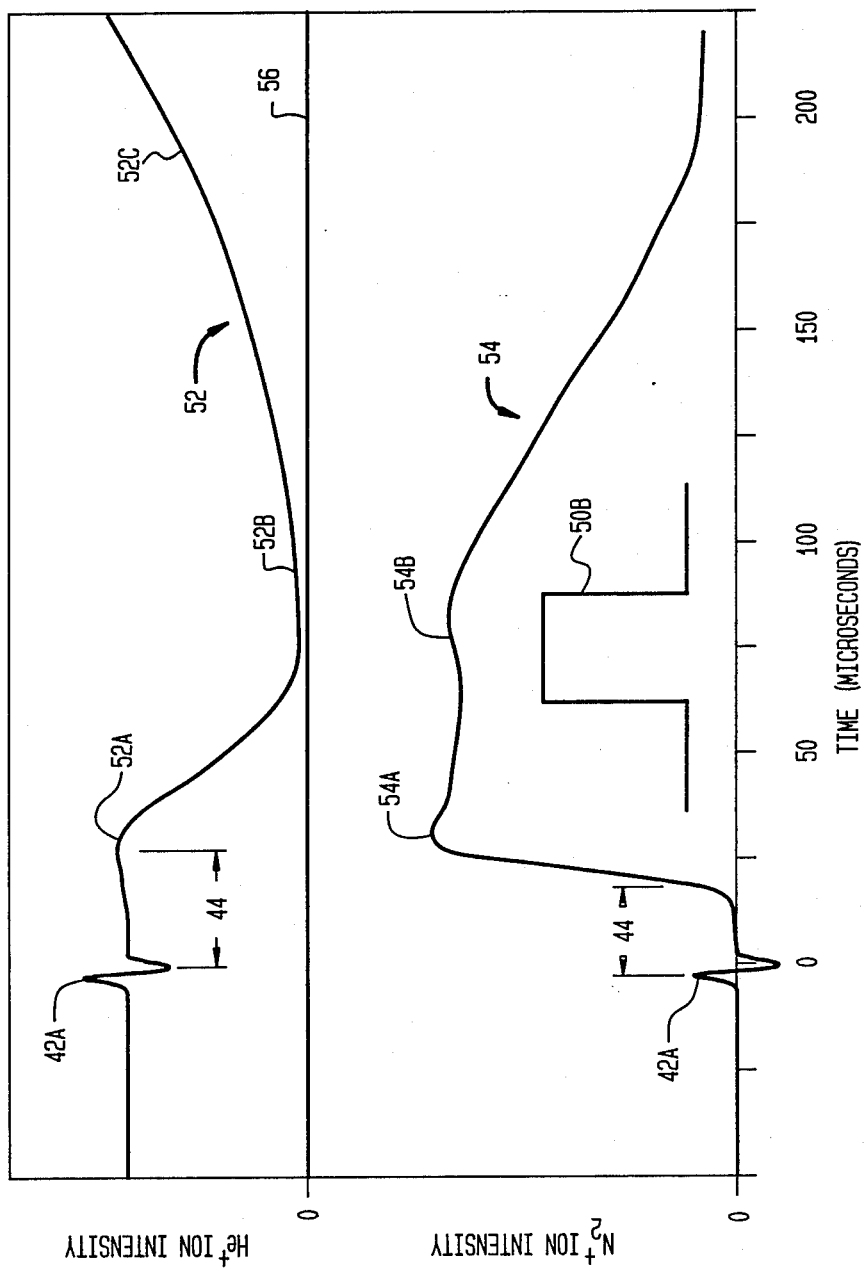
FIG. 3 shows a representation of an oscilloscope tracing of the signals generated by the system of FIG. 1.

Referring now to FIG. 3, for purposes of illustration there is shown a representation of an oscilloscope tracing indicating ionized molecules from sample gas pulse 20 reaching detector 28 during the operation of mass spectrometer system 10 having a hot filament ionizer as in FIG. 21. Trace 52 displays relative amounts of helium ions ($He^+$) as a function of time, and trace 54 displays relative amounts of nitrogen ions ($N_2^+$) as a function of time. Trace 52 of helium ions ($He^+$) represents an undesired background signal generated by small levels of interfering residual helium molecules from a previous analysis. Axis 56 represents a zero level for trace 52. Trace 54 of nitrogen ions ($N_2^+$) represents desired sample signals generated by ionized molecules from current sample gas pulse 20.

At pulse 42a, pulsed valve 16 releases sample gas pulse 20. Several microseconds later, with mass analyzer 26 tuned to $He^+$, detector 28 detects pulse 52a, reflecting rapidly decreasing amounts of helium. With mass analyzer 26 tuned to $N_2^+$, detector 28 detects pulse 54a, reflecting a rapidly increasing amount of nitrogen. Pulse 54a may reflect ionized molecules of the leading edge of Mach disk of sample gas pulse 20 as it passes through ionizer 22. Several microseconds later, trace 52, representing residual helium in vacuum chamber 12 continues to fall gradually, as background material is swept aside by the leading edge of sample gas pulse 20. Simultaneously, trace 54 begins to stabilize.

At pulse 50B, gated integrator 32 is opened, and signals from detector 28 are recorded by recorder 34. During pulse 50B, the central portion of ionized molecules from sample gas pulse 20 are impacting detector 28. Simultaneously with pulse 50B, background levels of helium at 52b have been reduced far below the average ambient level striking detector 28 between occurrences of pulse 50B. This represents a decrease in background noise portion of the signal-to-background ratio. Also simultaneously with pulse 50B, the amount of nitrogen detected at point 54b is stable at a level higher than would otherwise be possible. This represents an increase in the signal variable of the signal to background ratio. After pulse 50B, levels of helium return to average ambient background levels at point 52c, and levels of nitrogen are reduced below representative levels.

Figure 4A:
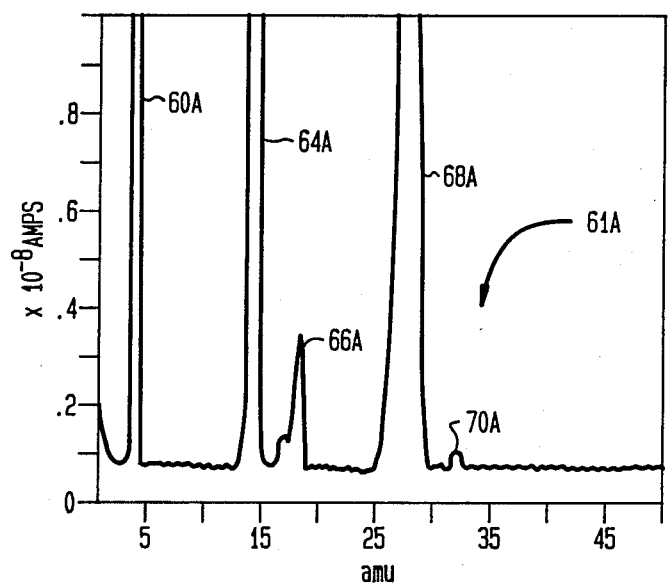
FIGS. 4A–B show a representation of a mass spectra recorder by the system of FIG. 1.
Figure 4B:
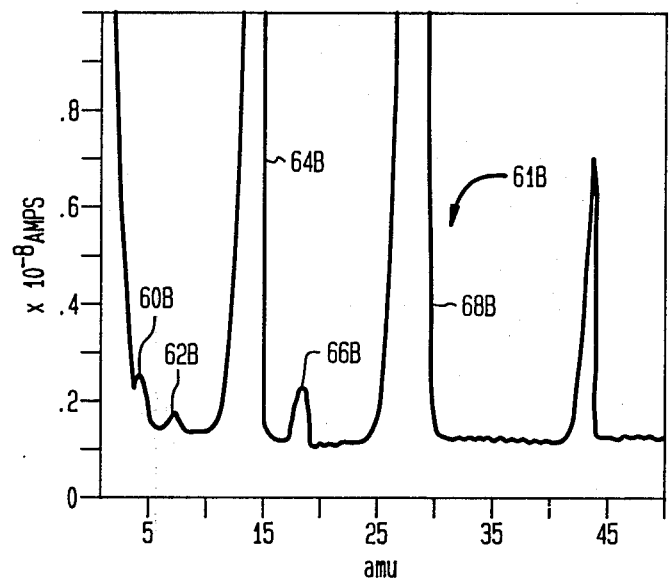

Referring now to FIGS. 4A, 4B, there is shown mass spectra of ionized molecules of sample gas pulse 20 as detected by detector 28. Trace 61a is a mass spectrum of ionized molecules detected without synchronously time-gating the input of gated integrator 32, prior to input to recorder 34.

In this case, the mass spectrum displays the time-averaged ion signals reaching the detector, as in the known art. Trace 61b is a mass spectrum of ionized molecules detected with sample signals gated by pulse 50B, before application to recorder 34. Thus a comparison of traces 61a,b may illustrate the effect of proper time gating of gated integrator 32.

Peak 60a of trace 61a represents helium (He+pk), peak 64a represents nitrogen (N+), peak 66a represents water ($H_2O^+$) peak 68a represents nitrogen ($N_2^+$), and peak 70a represents oxygen ($O_2^+$).

Trace 61a not only displays the presence of nitrogen gas introduced with sample gas pulse 20, but also the presence of residual helium gas from a previous analysis as well as small levels of residual water and oxygen. It would be difficult to determine which molecules were present in the current sample gas pulse 20, and which were interfering residual contaminants from previous samples.

Trace 61b represents ionized molecules detected by detector 28 and gated by pulse 50a and gated integrator 32. Trace 61b displays the presence of nitrogen gas as well as a low level of water. Because of the suppression of background signals caused by the gating initiated by pulse 50B, trace 61b more accurately represents the contents of the current sample gas pulse 20. This demonstrates the enhancement of the signal and the attenuation of the background noise over previous methods of mass spectrometry that results in a larger signal-to-background ratio.

Peaks 60b, 66b of trace 61b show decreased amounts of helium, water and oxygen compared with peaks 60a, 66a and 70a of trace 61a thus illustrating a decrease in response for these residual gases. On trace 61b waveform 62b corresponding to nitrogen ($N^{++}$) has appeared and waveforms 64b, 68b are relatively larger compared with 64a and 68b indicating the enhancement in useful sample signals attained by the synchronous time gating.

Figure 5:
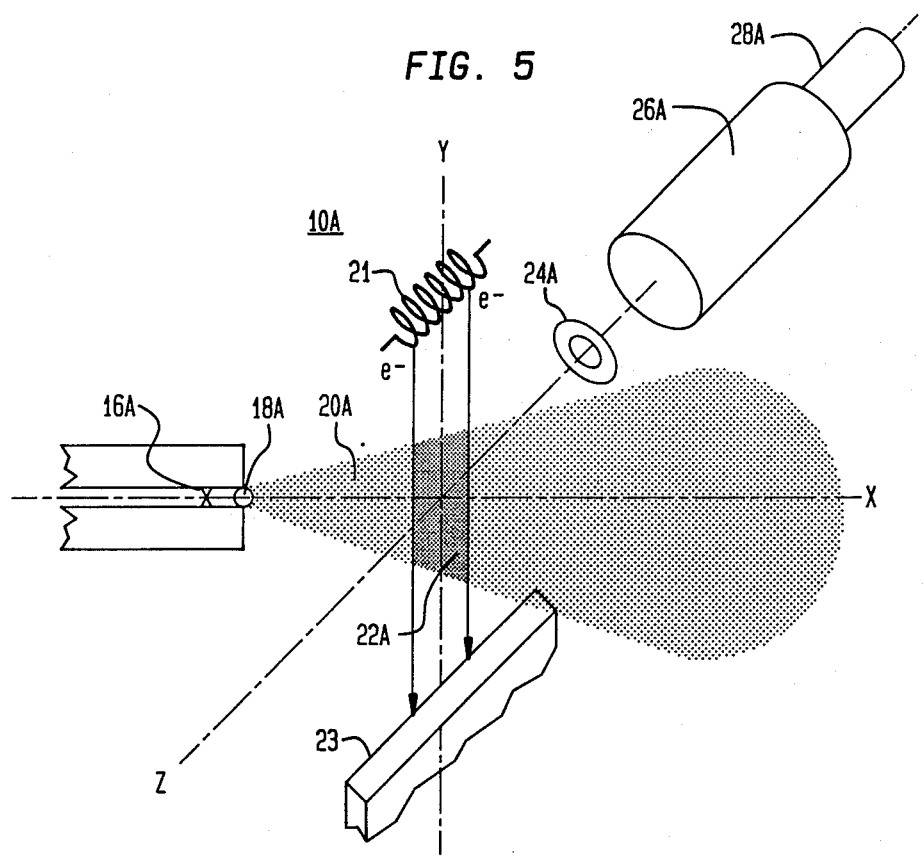
FIG. 5 shows an alternate embodiment of the system of FIG. 1.

Referring now to FIG. 5, there is shown an alternate embodiment of a portion of mass spectrometer system 10a wherein a mass analyzer 26a and a detector 28a are located on the Z axis orthogonal to the direction of travel of a sample gas pulse from pulsed valve 16a. The direction of travel of a sample gas pulse 20a is along the X axis in system 10a. This is compared with system 10 wherein the direction of travel of pulse 20, detector 28 and mass analyzer 26 are all along one axis.

In system 10a gas pulse 20a leaves nozzle orifice 18a of pulsed valve 16a and enters ionizing region 22a located between hot filament 21 and plate 23, located along the Y axis. Ionized molecules from gas pulse 20a are extracted by ion lenses 24A and drawn into mass analyzer 26a and then into detector 28a. This embodiment illustrates that pulsed valve 16a and nozzle orifice 18a may be located on different planes from analyzer 26a and detector 28a. The improved signal-to-background ratio previously described may still be produced in system 10a if the pressure of pulsed nozzle 16a and the diameter of orifice 18a are selected to provide substantially high density in sample gas pulse 20a as previously described and the distance between orifice 18a and ionizing region 22A is substantially short as also previously described. Such a selection of system 10a parameters provides a sample gas pulse 20a similar to pulse 20 of system 10 wherein an extremely high density portion is presented for ionizatior.

Figure 6:
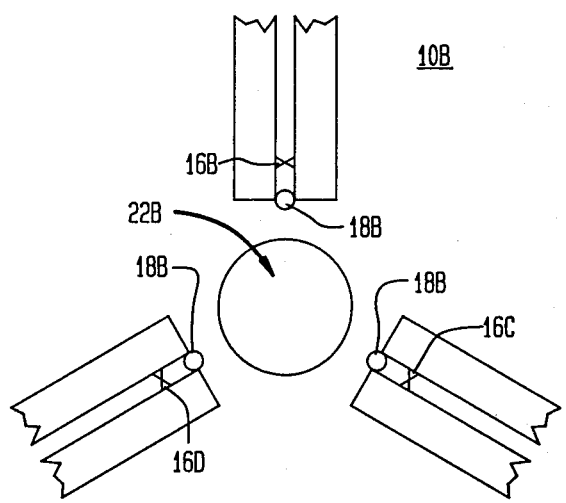
FIG. 6 shows a further alternate embodiment of the system of FIG. 1.

FIG. 6 shows still another embodiment, of mass spectrometer system 10b, wherein a plurality of pulsed valves 16b, 16c, 16d and nozzle orifices 18b are arranged at equal intervals around ionizing region 22b. As with system 10a in FIG. 5, an analyzer (not shown) and a detector (not shown) may be located orthogonal to the plane of pulsed valves 16b, 16c, 16d and nozzle orifices 18b.

There may be any number of pulsed valves such as pulsed valves 16b, 16c, 16d each having a nozzle orifice 18b. The number of valves permitted is limited only by the physical size of the pulsed valves and the distance that must be maintained between nozzle orifices 18b and ionizing region 22b. Each pulsed valve 16b, 16c, 16d and nozzle orifice 18b may be operated under the same conditions of pulse duration, nozzle pressure and diameter of nozzle orifice 18b as previously described in order to provide substantially high density sample gas pulses. Thus an independent sequence of pulses, such as the pulses of FIGS. 2A, B, may control and describe the operation of each pulsed valve 16b, c, d. Additionally, because of the high density of each sample gas pulse, a sample gas pulse from a valve 16b,c,d sweeps away residue sample gas from a sample gas pulse of a different valve 16b, c, d thus permitting nozzles 16b,c,d to be pulsed alternately without any decrease in signal-to-background ration due to previous sample gas pulses.

Pulsed valves 16b, 16c, 16d may be individually actuated in any order. By way of an example pulsed valve 16b may be actuated followed by pulsed valve 16c and followed by actuation of pulsed valve 16d. This order may then be repeated a plurality of times. By way of another example pulsed valve 16b may be actuated a plurality of times, followed by a plurality of actuations of pulsed valve 16c which may then be followed by a plurality of actuations of pulsed valve 16d.

Because of the enhanced signal-to-background effect described above, each stream of sample gas pulses from respective pulsed valves 16b, 16c, 16d in system 10b may contain different sample components without being contaminated by previous sample gas pulses from other pulsed valves 16b, 16c, 16d.

One stream of sample gas pulses from one pulsed valve 16b, 16c, 16d may contain a calibration or "span gas," and one or more streams of sample gas pulses may contain unknown gases. By this method, mass spectrometer system 10b may be continually calibrated on a pulse-to-pulse basis if desired. New calibrant gases may be introduced for each stream of gas pulses to be analyzed. Multiple streams from different points in a chemical process may be monitored with a single mass spectrometer system 10b using a plurality of pulsed valves 16b, 16c, 16d.

| Reference Numeral | Type |
| --- | --- |
| 16 | R. M. Jordan Co. #PSV General Valve Co. #9-181-900 |
| 22 | UTI Instruments #782-0011 Lambda Physik #EMG-101-MSC |
| 24 | Part of UTi Inst. #782-0011 or Extrel #041-4 |
| 26 | UTi #100C-12 |
| 28 | Galileo #4717 |
| 14 | Balzers #TSU512 |
| 30 | Keithley #427 |
| 32 | Stanford Research Systems #SR250 |
| 34 | IBM-PC/XT |

We claim:

1. A method for detecting trace levels of sample gas introduced through a nozzle into a mass spectrometer having a vacuum chamber with an ionizing region containing interfering residual background gas, comprising the steps of:
   (a) introducing into the vacuum chamber a substantially high density sample gas pulse, the density of the sample gas pulse being sufficient to sweep substantially all the residual background gas from the ionizing region;
   (b) ionizing at least a portion of the high density sample gas pulse;
   (c) extracting and imaging ions from the ionized gas; and
   (d) detecting the extracted ions.

2. A method for detecting trace levels of a sample gas introduced through a nozzle into a mass spectrometer having a vacuum chamber with an ionizing region containing a low level of interfering residual background gas, comprising the steps of:
   (a) introducing the sample gas at a substantially high pressure into the vacuum chamber through a substantially small nozzle orifice to produce a substantially high density of sample gas in the ionizing region substantially close to the orifice, the density of the sample gas being sufficient to sweep substantially all the residual background gas from the ionizing region close to the orifice;
   (b) ionizing at least a portion of the high density sample gas;
   (c) extracting and imaging ions from the ionized gas; and
   (d) detecting the extracted and imaged ions a predetermined time period after introduction of the sample gas.

3. The method of claim 1 wherein step (a) includes introducing sample gas at a pressure of from about one-thousandth Torr to one-hundreth Torr.

4. The method of claim 2 wherein step includes introducing sample gas at pressure of from about one one-thousandth Torr to five one-thousandth Torr.

5. The method of claim 2 wherein step (a) includes introducing sample gas at a pressure of about three one-thousandths Torr.

6. The method of claim 2 wherein the orifice of step (a) has a diameter of from about one-quarter millimeters to two millimeters.

7. The method of claim 2 wherein the orifice of step (a) has a diameter of from about one-quarter millimeter to one millimeter.

8. The method of claim 2 wherein the orifice of step (a) has a diameter of about one-half millimeter.

9. The method of claim 2 wherein step (b) includes ionizing the sample gas from about zero to ten inches from the orifice.

10. The method of claim 2 wherein step (b) includes ionizing the sample gas in an ionizing region location about two inches from the orifice.

11. The method of claim 2 comprising the further steps of:
    introducing a plurality of sample gas pulses;
    ionizing a portion of the sample gas of each pulse; and
    detecting ions of each pulse synchronously with the pulses.

12. The method of claim 11 wherein the mass spectrometer is provided with a mass analyzer further comprising the step of tuning the mass analyzer to differing levels of atomic mass units for differing pulses of the plurality of pulses.

13. The method of claim 1 wherein step (b) includes ionizing by means of a pulsed laser.

14. A method for detecting trace levels of a sample gas in a mass spectrometer having a vacuum chamber and a vacuum pump for evacuating the vacuum chamber, an ionizer, means for extracting ions, and a detector for detecting ions, comprising the steps of:
    (a) introducing a plurality of substantially high pressure sample gas pulses into the vacuum chamber through a substantially small orifice;
    (b) continuously evacuating the vacuum chamber for maintaining the pressure within the vacuum chamber; and,
    (c) increasing the sample gas pulse pressure until there is a substantially smooth flow of introduced sample gas from the orifice to the vacuum pump thereby sweeping substantially all of the introduced gas out of the chamber.

15. The method of claim 14 wherein step (c) includes increasing the sample gas pressure to a level of seventy Torr or higher.

16. The method of claim 14 wherein step (a) includes introducing pulses of a duration of about one hundred microseconds.

17. The method of claim 14 wherein step (b) includes maintaining a pressure of from about $10^{-8}$ to $10^{31}$ $^5$ Torr.

18. The method of claim 14 comprising the further steps of:
    extracting and imaging ions of each sample gas pulse; and
    detecting the extracted and imaged ions synchronously with the pulses.

19. A system for detecting trace levels of sample gas pulse introduced through a nozzle into a mass spectrometer having a vacuum chamber with an ionizing region containing a low level interfering residual background gas comprising:
    a substantially small nozzle orifice;

means for introducing the sample gas pulse through the nozzle orifice at a substantially high pressure into the vacuum chamber to produce a substantially high density of sample gas in the ionizing region substantially close to the orifice, the density of the sample gas being sufficient to substantially sweep the residual background gas from the ionizing region close to the orifice;

means for ionizing at least a portion of the sample gas in the high density sample gas region;

means for extracting and imaging ions from the ionized gas; and means for detecting the extracted and imaged ions a predetermined time period after introduction of the sample gas.

20. The system of claim 19 in which the introducing means provides sample gas at a pressure of from about one one-thousandths Torr to one one-hundredth Torr.

21. The system of claim 20 in which the introducing means provides sample gas at a pressure of from about one one-thousandth Torr to five one-hundredths Torr.

22. The system of claim 21 in which the introducing means provides sample gas at a pressure of about three one-thousandths Torr.

23. The system of claim 19 wherein the nozzle orifice has a diameter of from about one-quarter millimeter to two millimeters.

24. The system of claim 23 wherein the nozzle orifice has a diameter of from about one-quarter millimeter to two millimeters.

25. The system of claim 24 wherein the orifice has a diameter of approximately one-half millimeter.

26. The system of claim 19 wherein the ionizing means ionizes sample gas in an ionizing region located less than about ten inches from the orifice.

27. The system of claim 26 wherein the ionizing means ionizes gas in an ionizing region located about two inches from the orifice.

28. The system of claim 19 further comprising:
means for introducing a plurality of sample gas pulses;
means for ionizing a portion of the sample gas of each pulse; and
means for detecting ions synchronously with the pulses.

29. The system of claim 28 further comprising a mass analyzer having means for tuning the mass analyzer to differing levels of atomic mass units for differing pulses of the plurality of pulses.

30. A system for detecting trace levels of a sample gas in a mass spectrometer having a vacuum chamber and a vacuum pump for evacuating the vacuum chamber, an ionizer, means for extracting and imaging ions, and a detector for detecting ions, comprising:

means for introducing a plurality of substantially high pressure sample gas pulses into the vacuum chamber through a substantially small orifice;

means for continuously evacuating the vacuum chamber and maintaining the pressure within the vacuum chamber; and means coupled to the introducing means for increasing the pressure of the sample gas pulses until there is a substantially smooth flow of introduced sample gas from the orifice to the vacuum pump thereby sweeping substantially all of the introduced gas out of the vacuum chamber.

31. The system of claim 30 in which the coupled means increases the sample gas pulse pressure to a level of about seventy Torr or higher.

32. The system of claim 30 in which the introducing means provides gas pulses of a duration of about one hundred microseconds.

33. The system of claim 30 in which the vacuum pump includes means for maintaining a vacuum chamber pressure from about $10^{-8}$ Torr to $10^{-5}$ Torr.

34. The system of claim 30 further comprising:
means for ionizing at least a portion of each sample gas pulse;
means for extracting and imaging ions; and
means for detecting the extracted and imaged ions synchronously with the pulses.

35. A system for detecting trace levels of a sample gas introduced into a mass spectrometer having a vacuum chamber with an ionizing region containing a lower level of interfering residual background gas comprising:

first and second substantially small nozzle orifices;

means for sequentially introducing respective first and second substantially high density samples gas pulses through the first and second nozzle orifices into a single ionizing region close to the orifices, the density of each sample gas pulse being sufficient to substantially sweep the previously introduced sample gas pulse from the ionizing region;

means for ionizing at least a portion of each of the first and second sample gas pulses to provided respectively first ionized molecules and second ionized molecules;

means for separately extracting the first and second ionized molecules; and means for separately detecting the extracted first and second ionized molecules at predetermined time periods after introduction of the first and second sample gas pulses.

36. The system of claim 34 further comprising at least three substantially small nozzle orifices in a spaced apart relationship around the ionizing region.

37. The system of claim 34 wherein the first and second substantially small nozzle orifices introduce sample gas pulses formed of differing substances.

* * * * *

UNITED STATES PATENT AND TRADEMARK OFFICE
CERTIFICATE OF CORRECTION

PATENT NO. : 4,855,594

DATED : August 8, 1989

INVENTOR(S) : Kimock, et al

It is certified that error appears in the above-identified patent and that said Letters Patent is hereby corrected as shown below:

Column 13, Line 63, Claim 3
 Replace "1" with -- 2 --
Column 13, Line 66, Claim 4
 Insert -- (a) -- after "step"
Column 13, Line 67, Claim 4
 Insert -- a -- after "at"
Column 14, Line 16, Claim 10
 Replace "location" with -- located --
Column 14, Line 55, Claim 17
 Replace "$10^{31\ 5}$" with -- $10^{-5}$ --
Column 14, Line 59, Claim 18
 Add the phrase -- ionizing at least a portion of each sample gas pulse; -- prior to the phrase beginning with the term "extracting"
Column 15, Line 1, Claim 19
 Replace "pulse" with -- pulses --

Signed and Sealed this

Nineteenth Day of February, 1991

Attest:

HARRY F. MANBECK, JR.

*Attesting Officer*   *Commissioner of Patents and Trademarks*